(12) United States Patent
Heo

(10) Patent No.: US 7,654,166 B2
(45) Date of Patent: Feb. 2, 2010

(54) APPARATUS FOR AUTOMATICALLY ADJUSTING YOKE CLEARANCE IN A STEERING DEVICE

(75) Inventor: Sung-moo Heo, Wonju (KR)

(73) Assignee: Mando Corporation (KR)

( * ) Notice: Subject to any disclaimer, the term of this patent is extended or adjusted under 35 U.S.C. 154(b) by 0 days.

(21) Appl. No.: 12/069,932

(22) Filed: Feb. 14, 2008

(65) Prior Publication Data

US 2008/0202271 A1 Aug. 28, 2008

(30) Foreign Application Priority Data

Feb. 27, 2007 (KR) .................. 10-2007-0019613

(51) Int. Cl.
*F16H 55/18* (2006.01)
(52) U.S. Cl. .......................... 74/409; 74/422
(58) Field of Classification Search ............... 74/89.17, 74/388 PS, 409, 422, 392, 410, 440, 498, 74/500, 395; 180/93.515, 93.514; 280/427, 280/429; 384/40–45; *F16H 1/04, 55/18; B62D 3/12*
See application file for complete search history.

(56) References Cited

U.S. PATENT DOCUMENTS

| | | | | | |
|---|---|---|---|---|---|
| 3,433,501 | A | * | 3/1969 | Hertel | 280/93.515 |
| 3,585,875 | A | * | 6/1971 | Adams | 74/392 |
| 3,680,443 | A | * | 8/1972 | Jenvey | 91/375 A |
| 5,117,705 | A | * | 6/1992 | Guasch | 74/422 |
| 5,265,691 | A | * | 11/1993 | Konishi et al. | 180/400 |
| 5,287,764 | A | * | 2/1994 | Beer | 74/498 |
| 5,718,149 | A | * | 2/1998 | Phillips | 74/422 |
| 5,746,285 | A | * | 5/1998 | Yonezawa | 180/428 |
| 5,931,046 | A | * | 8/1999 | Phillips | 74/422 |
| 6,591,706 | B2 | * | 7/2003 | Harer et al. | 74/422 |
| 6,736,021 | B2 | | 5/2004 | Adams et al. | |

FOREIGN PATENT DOCUMENTS

| | | |
|---|---|---|
| KR | 10-2003-0054495 | 7/2003 |
| KR | 10-2007-0055265 | 5/2007 |

* cited by examiner

*Primary Examiner*—Richard W L Ridley
*Assistant Examiner*—Phillip Johnson
(74) *Attorney, Agent, or Firm*—Harness, Dickey & Pierce, P.L.C.

(57) ABSTRACT

Apparatus for automatically adjusting yoke clearance in a steering device in a rack-pinion type steering device.

6 Claims, 4 Drawing Sheets

APPARATUS FOR AUTOMATICALLY ADJUSTING YOKE CLEARANCE IN A STEERING DEVICE

CROSS-REFERENCE TO RELATED APPLICATION

This non-provisional application claims priority under 35 U.S.C §119(a) on Patent Application No. 10-2007-0019613 filed in Korea on Feb. 27, 2007, the entire contents of which are hereby incorporated by reference.

BACKGROUND OF THE INVENTION

1. Field of the invention

The present invention relates to an apparatus for automatically adjusting yoke clearance in a steering device, and more particularly to an apparatus for automatically adjusting yoke clearance in a steering device, which includes a middle member for removing a clearance between a yoke plug and a support yoke and applying force in a direction of a rack bar to the yoke plug, so as to automatically compensate for a clearance caused by long time use of the steering device.

2. Description of the Prior Art

A steering device refers to an apparatus for changing a proceeding direction of a vehicle according to a driver's will, which can help the driver to freely change the direction in which a front wheel of the vehicle turns around, so as to move the vehicle in the direction the driver wants.

FIG. 1 is a view schematically showing a steering device for a common vehicle.

As shown in FIG. 1, a conventional steering device includes a steering wheel 100 placed at a driver's seat and a steering shaft 105 connected thereto, a steering column 103 fixing the steering shaft to a vehicle body, a gear box 130 including a rack gear 110 and a pinion gear 120, which convert a rotation force received from the steering shaft 105 into a rectilinear motion, a rack bar 140 including inner ball joints 135 at both ends thereof, a tie rod 150 integrally formed with a ball of the inner ball joint 135, and an outer ball joint 155 disposed at the end of the tie rod 150.

In the case of a Rack and Pinion Gear type steering device, inner ball joints 135 are disposed at right and left ends of the rack bar 140 on which the rack gear 110 is formed. The inner ball joints 135 are connected to the tie rods 150. Additionally, the tie rod 150 is connected to the outer ball joint 155 and transmits force to a knuckle 159 to steer tires 158.

FIG. 2 is a view showing a cross-section of a conventional gear box.

The conventional Rack and Pinion type gear box 130 includes a pinion gear 120, a rack bar 140, a support yoke 260, a spring 263 and a yoke plug 265. The Rack and Pinion type gear box 130 converts the rotation force received from a steering shaft (not shown) into a rectilinear motion, as described above.

The rack bar 140 is engaged with the pinion gear 120, and converts the rotational motion into a rectilinear motion. An apparatus for supporting the rack bar 140 in the direction of the pinion gear 120 so as to help engagement between the rack bar 140 and the pinion gear 120 is disposed on the rear surface of the rack bar 140.

The apparatus for supporting the rack bar 140 includes the support yoke 260, the spring 263 and the yoke plug 265. The support yoke 260 is disposed on the opposite side to the rear surface of the rack bar 140, that is, on the opposite side to the surface on which the rack gear 110 is formed. The support yoke 260 is inserted in the cylinder 250 of the gear box 130 and is linearly movable in a direction perpendicular to the rack bar 140.

The support yoke 260 has a cylindrical shape so that it can linearly slide within the cylinder 250. A front part of the support yoke 260 is in contact with the rack bar 140 and has a semicircular groove that can come in close contact with the rear surface of the rack bar 140.

In addition, the spring 263 is disposed behind the support yoke 260 so as to push the support yoke 260 with a constant pressure and compensate for a clearance between the rack bar 140 and the pinion gear 120, so that the rack bar 140 and the pinion gear 120 can come into close contact with each other and can effectively transfer force between them.

Such a support yoke 260 causes friction while sliding on the rear surface of the rack bar 140. A plastic support yoke 260 which is more ductile than the rack bar 140 is usually used in order to prevent the rack bar 140 from being worn or from generating noise due to the sliding friction.

The spring 263 performs a function of applying pressure to the support yoke 260 to come in close contact with the rack bar 140, and a coil spring is generally used as the spring 263 above. The yoke plug 265 is disposed at the rear surface of the spring 263 and support the spring 263.

The yoke plug 265 applies pressure to the support yoke 260 by supporting the spring 263. A male screw thread is commonly formed on the yoke plug 265 so that the yoke plug 265 is engaged with a female screw thread formed on the gear box 130. A groove into which a wrench can be inserted is formed on the rear surface of the yoke plug 260.

As such, since a conventional assembling structure of the support yoke 260 employs a screw coupling method, the conventional assembling structure has a very weak assembling ability and requires an additional process of adjusting and examining a yoke clearance after the assembling. Moreover, the conventional assembling structure has a clearance (see A of FIG. 2, hereinafter, referred to as 'yoke clearance') formed between the support yoke 260 and the yoke plug 265, and has rattle noise generated due to contact between the support yoke 206 and the yoke plug 265 when the rack bar 140 strongly pushes the support yoke 260 in a reverse direction by a force reversely input from the irregular road surface, etc.

SUMMARY OF THE INVENTION

Accordingly, the present invention has been made to solve the above-mentioned problems occurring in the prior art, and the present invention provides an apparatus for automatically adjusting yoke clearance in a steering device, which includes a middle member for removing a clearance between a yoke plug and a support yoke and applying force in a direction of a rack bar to the yoke plug, so as to automatically compensate for a clearance caused by long time use of the steering device and prevent occurrence of rattle noise.

In accordance with an aspect of the present invention, there is provided an apparatus for automatically adjusting yoke clearance in a steering device in a rack-pinion type steering device including a rack and a pinion gear, the apparatus including: a support yoke inserted in a gear box to support the rack bar, the support yoke having first sloping surfaces formed on both sides of a diameter of a rear surface of the support yoke, each of the first sloping surfaces having a predetermined angle, the support yoke having a first insertion hole formed through a center of the rear surface; a spacer including sloping members, an elastic member, and an eject pin, the sloping members being disposed on the rear surface of the support yoke, each of the sloping members having an insertion groove formed on a outer cylindrical surface thereof and a second sloping surface to be in contact with the first sloping surface, the sloping members forming a second insertion hole through a center of the sloping members when the sloping members are put together, the elastic member being seated in the insertion groove and applying force in a horizontal direction, and the eject pin being inserted through the second insertion hole and forming a gap between the sloping members; and a yoke plug fastened to the gear box, supporting the spacer, and having a third insertion hole formed through a center of the yoke plug, wherein when the eject pin disposed in the first to the third insertion holes is detached, horizontal force generated by the elastic member is converted into vertical force by the first and the second sloping surfaces, so as to support the rack bar.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
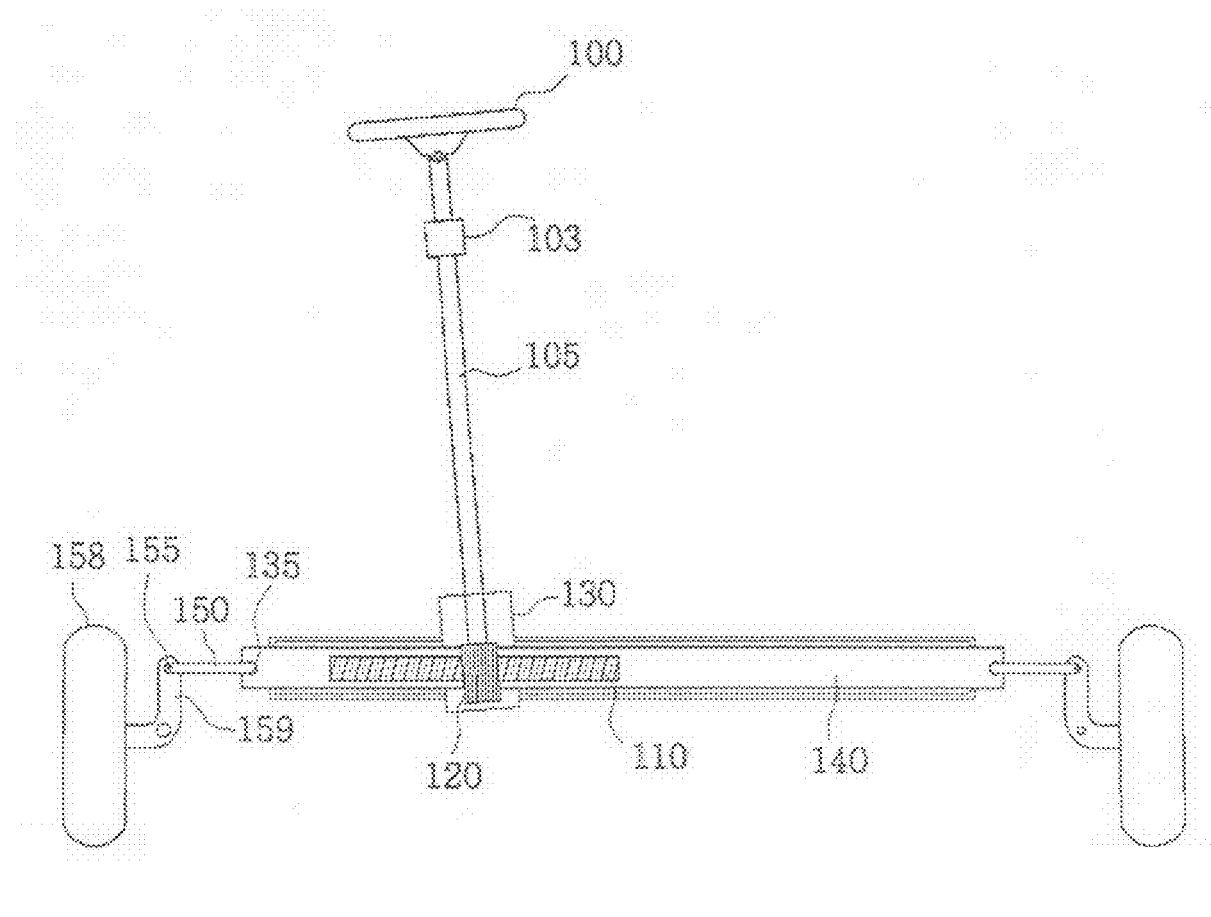
FIG. 1 is a view schematically showing a steering device for a common vehicle.
Figure 2:
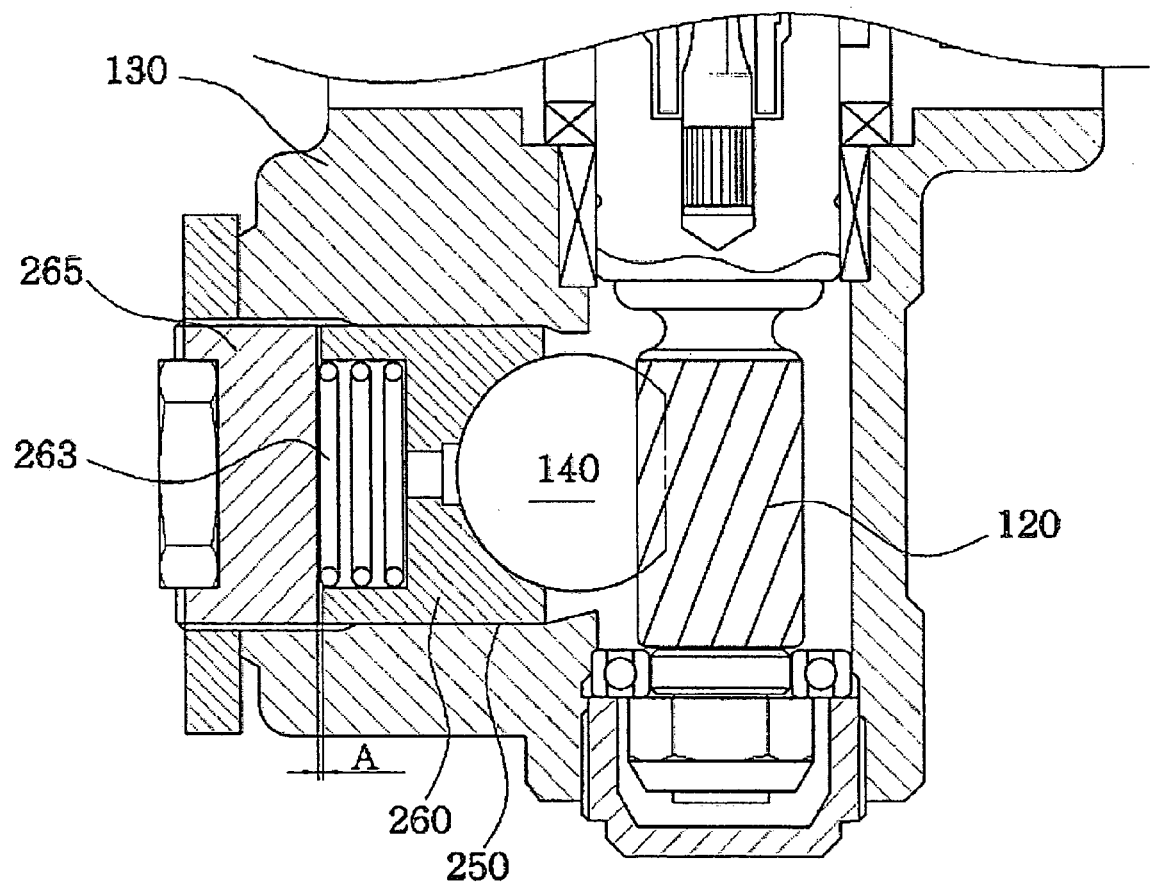
FIG. 2 is a cross-sectional view of a conventional gear box.

Hereinafter, an exemplary embodiment of the present invention will be described with reference to the accompanying drawings. In the following description and drawings of the present invention, the same reference numerals are used to designate the same or similar components, and the detailed description of known functions and configurations incorporated herein is omitted to avoid making the subject matter of the present invention unclear.

Figure 3:
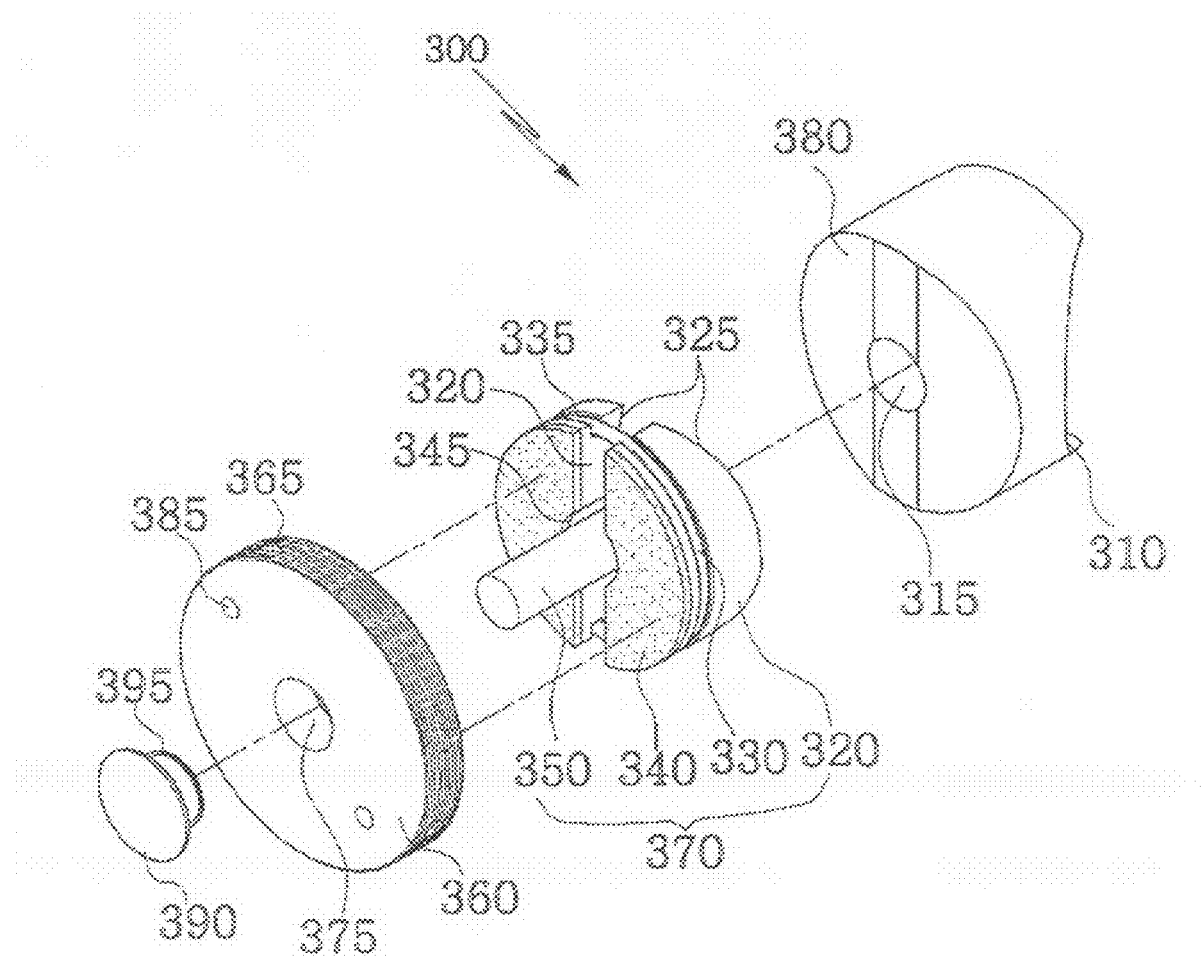
FIG. 3 is an exploded perspective view of an apparatus for adjusting yoke clearance according to an exemplary embodiment of the present invention.
Figure 4:
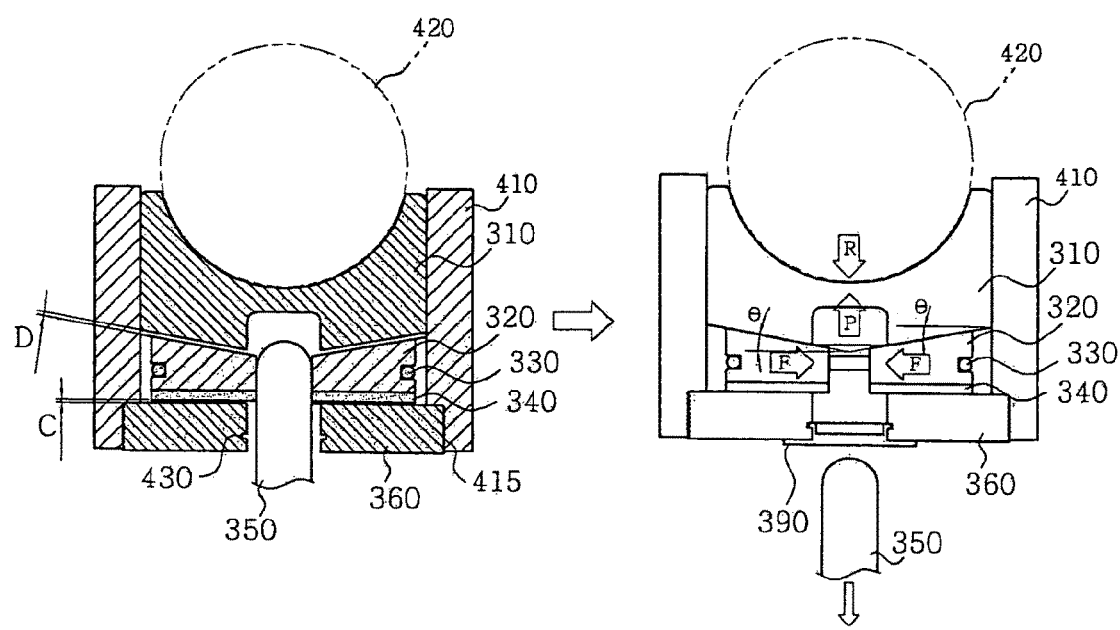
FIG. 4 is a cross-sectional view for showing a method for mounting an apparatus for adjusting yoke clearance according to an exemplary embodiment of the present invention.

FIG. 3 is an exploded perspective view of an apparatus for adjusting yoke clearance according to an exemplary embodiment of the present invention, and FIG. 4 is a cross-sectional view for showing a method for mounting an apparatus for adjusting yoke clearance according to an exemplary embodiment of the present invention.

An apparatus for automatically adjusting yoke clearance 300 according to an exemplary embodiment of the present invention includes a support yoke 310, sloping members 320, an elastic member 330, rubber pads 340, an eject pin 350 and a yoke plug 360.

The front surface of the support yoke 310 has a semicircle groove formed thereon for coming in contact with the rear surface of the rack bar 420. A first insertion hole 315 is formed through the center of the rear surface of the support yoke 310 in such a manner that an eject pin 350 necessary for assembling is inserted in the first insertion hole. First sloping surfaces 380 are formed on both sides of the first insertion hole 315. Each of the first sloping surfaces 380 makes a predetermined slope angle θ with respect to a horizontal surface, and both of the first sloping surfaces have the same slope angle θ. The first sloping surfaces 380 are symmetrically formed centering a diameter line of the support yoke 310 in a view from the rear surface of the support yoke 310, wherein the position of the diameter line is not limited only if the diameter line portion corresponds to a portion which protrudes most.

A spacer 370 is disposed at the rear surface of the support yoke 310. The spacer 370 includes the sloping members 320, the rubber pads 340, the elastic member 330 and the eject pin 350.

The sloping members 320 have shapes of parts which are equally divided from a short cylinder, and each of the sloping members 320 has a second sloping surface 325 getting higher as it gets farther from a central line equally dividing the short cylinder. Further, each of the sloping members 320 has an insertion groove 335 formed on semi-cylindrical outer peripheral surface thereof. Besides, in a state where the two sloping members 320 are put together, a second insertion hole 345 is formed through the central part of the two sloping members 320, and the angle that the second sloping surface 325 makes with respect to the horizontal surface is identical to the slope angle θ of the first sloping surface of the support yoke 310.

The rubber pads 340 are attached to the rear surfaces of the sloping members 320, respectively. The elastic member 330 is seated in the insertion groove 335 formed on the outer semi-cylindrical surface of each of the sloping members. It is the most desirable to use a Metal C-ring as the elastic member 330. However, there is no limitation in the shape and the material of the elastic member 330 and the insertion groove 335 as long as the sloping members have a structure capable of providing force (hereinafter, referred to as 'horizontal force F') by which the sloping members tend to be closer to each other.

In the state where the elastic member 330 is mounted in the insertion groove 335, two sloping members 320 are widened as much as a certain space in both directions. Thereafter, the eject pin 350 is inserted into the second insertion hole 345, so that the two sloping members are kept widened. Then, the eject pin 350 is fixed by using a horizontal force F by the elasticity of the elastic member 330.

The yoke plug 360 has a low cylindrical shape, has a male screw thread 365 formed on an outer circumferential surface thereof, and has a third insertion hole 375 formed through a center thereof. Additionally, although two fastening units 385 shaped like a round groove are illustrated in the rear surface of the yoke plug 360, the shape of the fastening unit 385 is not limited as long as the yoke plug 360 can be rotated by means of a tool.

The support yoke 310 and the spacer 370 are sequentially inserted in the gear box 410. Then, the yoke plug 360 is fastened to the female screw thread 415 formed on the inner peripheral surface at the entrance part of the gear box 410. As a result of the fastening as described above, the eject pin 350 located inside the first to the third insertion holes 315, 345 and 375 partially protrudes out of the yoke plug 360, and predetermined gaps C and D are formed between the spacer 370 and the yoke plug 360 or between the spacer 370 and the support yoke 310.

In this state, if the eject pin 350 is detached, the space between the sloping members 320 is reduced by the horizontal force F applied by the elastic member 330. Finally, the gap C is removed by the first sloping surfaces 380 of the support yoke 310 and the second sloping surfaces 325 of the sloping members 320, and simultaneously the horizontal force F generated by the elastic member 330 is converted into force in a vertical direction (hereinafter, referred to as 'vertical force P'), so that the support yoke 310 pushes the rack bar 420 with a constant force.

Preferably, a dust cap 390 is inserted through the insertion hole 375 in order to prevent introduction of alien substances after the Pin 350 is detached. In order to assemble the dust cap 390, a locking groove 430 and a locking protrusion 395 are formed on the inner peripheral surface of the third insertion hole 375 and the outer peripheral surface of the dust cap 390, respectively. The locking groove 430 and the locking protrusion 395 have shapes of a male screw thread and a female screw thread, respectively. However, there is no limit in their shapes as long as the dust cap 390 can prevent the introduction of alien substances.

When the rack bar 420 linearly alternates during steering, the support yoke 310 in contact with the rear surface of the rack bar 420 is worn away. Although the wearing of the support yoke 310 occurs, he wear is automatically compensated by the vertical force P converted from the horizontal force F of the elastic member 330 by the first sloping surface and the second sloping surface. Therefore, the support yoke supports the rack bar 420 with an always constant force.

In the meantime, in the case where a reverse input occurs during driving, the support yoke operates without any change when the vertical force P is greater than a reverse force R. When the reverse force R is greater than the vertical force P, the maximum distance by which the rack bar 420 moves downward is approximately 0.5 mm. Hereinafter, a method of absorbing shock will be described.

The friction between the sloping members 320 and the support yoke 310 is nearly ignorable as compared with the friction between the rubber pads 340 and the yoke plug 360. Therefore, in the state where a contact surface between the yoke plug 360 and the rubber pad 340 is fixed, the support yoke 310 moves down, and the first and the second sloping surfaces 380 and 325 between the support yoke 310 and the sloping member 320 slip on each other. Simultaneously, the rubber pad 340 is elastically deformed, while the sloping member 320 absorbs the shock of the reverse force R. Thereafter, the elastically deformed rubber pad 340 is restored to its original state, and the support yoke 310 returns to its original position.

In addition, the vertical force P is required to have various values according to the kinds of vehicles. Here, it is possible to design a desired vertical force P by changing the angle θ of the first sloping surface and the second sloping surface and the elastic force of the elastic member 330.

Meanwhile, a gap between the sloping members 320 may be generated by fastening force of the yoke plug 360 without forming or including the eject pin 350, the first to third insertion holes 315, 345 and 375, and the rubber pad 340. Then, the vertical force P applied to the rack bar 420 is generated by the elasticity of the elastic member 330, the first sloping surface 380 and the second sloping surface 325. The friction between the first sloping surface 380 and the second sloping surface 325, that is, the friction between the sloping members 320 and the support yoke 310, is nearly ignorable as compared with the friction between the rubber pads 340 and the yoke plug 360. Therefore, the reverse force R can be absorbed while then the two sloping members 320 return to their original positions by the elasticity of the elastic member 330 from the state where the space between the two sloping members 320 has been widened.

Consequently, various configuration may be possible, for example, a structure where the horizontal force F, which the elastic member 330 applies to the sloping members 320, including the first sloping surface 380 formed on the rear surface of the support yoke 310 and the second sloping surface 325 of the sloping member 320, is converted into the vertical force P by the first and the second sloping surface 380 and 325, so as to support the rack bar 420.

As described above, according to the present invention, the horizontal force generated from the elastic member is converted into the vertical force by the first and the second sloping surfaces, so as to support the support yoke, thereby removing the cause of the rattle noise. Moreover, according to the present invention, it is unnecessary to manage tolerance of the yoke clearance, which simplifies the assembly process and facilitates the assembling work. Moreover, the yoke clearance can be automatically compensated even if abrasion of the yoke occurs.

The spirit of the present invention has been described above for illustrative purposes, it is understood by those skilled in the art to which the present invention belongs that various changes and modifications in forms and details may be made therein without departing from the essential characteristics of the present invention. Accordingly, disclosed embodiments of the present invention are not intended to limit but intended to describe the spirit of the present invention. The spirit of the present invention is not limited to such embodiments. The protecting range of the present invention is to be construed according to the appended claims and it should be construed that every technical spirit within ranges equivalent to the claims are included in the scope of the present invention.

What is claimed is:

1. An apparatus for automatically adjusting yoke clearance in a steering device in a rack-pinion type steering device including a rack with a rack bar and a pinion gear, the apparatus comprising:
    a support yoke inserted in a gear box having an arcuate pocket to support the rack bar, the support yoke having a major surface opposite the rocket defined by first and second sloping faces, the first and second sloping faces diverging at an angle from a central portion of the yoke radially outwardly toward the rack bar, the yoke having a first insertion hole formed in the major surface between the first and second sloping faces;
    a spacer including first and second spaced apart sloping members, the first and second sloping members having sloping faces generally complimentary to the first and second sloping faces on the major surface of the yoke, each of the sloping members having an insertion groove formed on a outer cylindrical surface thereof, inner portions of the first and second sloping members forming a second insertion hole, an elastic member seated in the insertion groove and applying force to the first and second sloping members in a radial inward direction; and
    a yoke plug fastened to the gear box, supporting the spacer, and having a third insertion hole formed through a center of the yoke plug,
    wherein an eject pin can be disposed in the first to the third insertion holes during assembly and then removed, where upon removal a radial inward force generated by the elastic member is converted into a generally perpendicular force towards the rack bar by the first and the second sloping surfaces, to thereby support the rack bar.

2. The apparatus as claimed in claim 1, wherein the elastic member corresponds to a metal C-ring.

3. The apparatus as claimed in claim 1, further comprising rubber pads between the sloping members and a bottom of the gear box.

4. The apparatus as claimed in claim 1, comprising a fastening unit for attaching and detaching the yoke plug to and from a rear surface of the yoke plug.

5. The apparatus as claimed in claim 1, further comprising a dust cap for preventing introduction of alien substances into the third insertion hole.

6. A self-adjusting yoke clearance apparatus in a rack-pinion type steering device, comprising:
- a support yoke having an arcuate pocket for engaging and supporting a rack bar, the support yoke having first and second sloping faces opposite the arcuate pocket, the first and second sloping faces diverging symmetrically at a predetermined angle from a center of the support yoke radially outwardly toward the rack bar, the support yoke having a first insertion hole formed in a center of the support yoke between the first and second sloping faces;
- a spacer including first and second spaced apart sloping members, the first and second sloping members having sloping faces that are generally complimentary to the first and second sloping faces of the support yoke, each of the sloping members having an insertion groove formed radially on an outer cylindrical surface thereof, the spacer having a second insertion hole formed by inner portions of the first and second sloping members;
- an elastic member seated in the insertion groove and applying force to the first and second sloping members in a radial inward direction such that the force generated by the elastic member is converted into a generally perpendicular force towards the rack bar by the first and second sloping members to support the rack bar;
- a gear box including the support yoke and the spacer therein;
- rubber pads removably attached to the sloping members, positioned between the sloping members and a bottom of the gear box for absorbing shocks generated by the rack bar;
- a yoke plug fastened to the gear box, supporting the spacer, and having a third insertion hole formed through a center of the yoke plug;
- a fastening member having a round recess in a rear surface of the yoke plug for attaching and detaching the yoke plug from the gear box; and
- a dust cap for preventing introduction of alien substances into the third insertion hole.

* * * * *